(12) United States Patent
Ismert

(10) Patent No.: US 9,683,685 B2
(45) Date of Patent: Jun. 20, 2017

(54) PLUMBING FITTING ASSEMBLIES

(71) Applicant: Dominic P. Ismert, Marshall, MI (US)

(72) Inventor: Dominic P. Ismert, Marshall, MI (US)

( * ) Notice: Subject to any disclaimer, the term of this patent is extended or adjusted under 35 U.S.C. 154(b) by 0 days.

(21) Appl. No.: 14/529,264

(22) Filed: Oct. 31, 2014

(65) Prior Publication Data
US 2015/0122342 A1 May 7, 2015

Related U.S. Application Data

(60) Provisional application No. 61/898,930, filed on Nov. 1, 2013, provisional application No. 61/898,916, filed on Nov. 1, 2013, provisional application No. 61/898,901, filed on Nov. 1, 2013.

(51) Int. Cl.
*F16L 19/02* (2006.01)
*F16L 55/115* (2006.01)
*E03D 1/32* (2006.01)
*E03C 1/02* (2006.01)
(Continued)

(52) U.S. Cl.
CPC .......... *F16L 19/0231* (2013.01); *E03C 1/021* (2013.01); *E03D 1/32* (2013.01); *F16K 5/061* (2013.01); *F16K 27/067* (2013.01); *F16L 55/1152* (2013.01); *Y10T 137/0447* (2015.04); *Y10T 137/0486* (2015.04); *Y10T 137/0491* (2015.04); *Y10T 137/5109* (2015.04); *Y10T 137/7361* (2015.04); *Y10T 137/7462* (2015.04)

(58) Field of Classification Search
CPC ....... F16L 19/00; F16L 19/02; F16L 19/0206; F16L 19/0212; F16L 19/0218; F16L 19/0231; F16L 19/0237; F16L 19/025; F16L 19/04; F16L 19/041; F16L 19/043; F16L 19/045; F16L 19/048; F16L 19/05; F16L 19/055; F16L 55/115; F16L 55/1152; F16L 19/06; F16L 19/065; F16L 19/0653; F16L 55/1108; F16K 27/06; F16K 27/067; F16K 5/06; F16K 5/061; F16K 5/0626; E03D 1/32; E03D 1/021; Y10T 137/0447; Y10T 137/5109; Y10T 137/0486; Y10T 137/0491; Y10T 137/7462
USPC ...... 251/148, 315.01–315.16, 304, 309–312; 285/12
See application file for complete search history.

(56) References Cited

U.S. PATENT DOCUMENTS

| | | | |
|---|---|---|---|
| 2,080,271 A * | 5/1937 | Hirst | F16L 19/06 277/622 |
| 2,886,067 A * | 5/1959 | Maxwell | F16L 55/115 138/90 |
| 3,194,258 A | 7/1965 | Grant | |

(Continued)

FOREIGN PATENT DOCUMENTS

NO    WO 0019136 A1 * 4/2000 .......... F16L 19/0206

*Primary Examiner* — Kevin Murphy
*Assistant Examiner* — David Colon Morales
(74) *Attorney, Agent, or Firm* — Polsinelli PC

(57) ABSTRACT

Plumbing fitting assemblies are described. The plumbing fitting assemblies use a male and female fitting combination that enables a user or installer to make a sealed connection on an internal diameter of a female part or receiving end by way of an o-ringed shank on a male part or insert end. A connecting device is rotatably attached to the male end. The connecting device also engages to an outer surface of the female part such that the sealed fitting assemblies will not disconnect under normal pressure of a fluid or air working through the assemblies.

28 Claims, 10 Drawing Sheets

(51) Int. Cl.
*F16K 5/06* (2006.01)
*F16K 27/06* (2006.01)

(56) References Cited

U.S. PATENT DOCUMENTS

| | | | |
|---|---|---|---|
| 3,693,649 A | 9/1972 | Gordon et al. | |
| 4,100,928 A | 7/1978 | Schoepe | |
| 4,434,811 A * | 3/1984 | Murdoch | E21B 17/08 137/515 |
| 4,478,438 A * | 10/1984 | Elorriaga, Jr. | F16L 27/0812 285/276 |
| 4,573,712 A * | 3/1986 | Cameron | F16L 25/14 285/12 |
| 4,592,388 A * | 6/1986 | Wilcox | F16L 37/008 137/615 |
| 4,600,031 A | 7/1986 | Nestich | |
| 4,678,161 A * | 7/1987 | Bando | F16K 5/0626 251/171 |
| 4,801,160 A * | 1/1989 | Barrington | F16L 19/0218 285/110 |
| 4,923,221 A * | 5/1990 | Taylor | F16L 55/1152 285/354 |
| 5,007,452 A | 4/1991 | Antunez | |
| 5,035,257 A | 7/1991 | Antunez | |
| 5,246,200 A * | 9/1993 | Barker | E03C 1/02 137/556 |
| 5,287,882 A | 2/1994 | Mikol | |
| 5,595,368 A * | 1/1997 | Bogdany | F16L 19/02 137/515 |
| 5,694,978 A * | 12/1997 | Heilmann | F16L 55/1152 138/103 |
| 6,102,067 A | 8/2000 | Orlando | |
| 6,481,761 B2 * | 11/2002 | Schroeder | F16L 19/0218 285/328 |
| 7,204,267 B1 * | 4/2007 | Persico | E03C 1/021 137/357 |
| 7,328,723 B1 * | 2/2008 | Van Meter | F16L 55/115 138/89.4 |
| 2002/0109116 A1 * | 8/2002 | Stolzman | F16K 5/0642 251/144 |
| 2002/0140221 A1 * | 10/2002 | Cooper | F16L 37/088 285/33 |
| 2005/0127664 A1 * | 6/2005 | Arth | B29C 65/02 285/21.1 |
| 2006/0192382 A1 * | 8/2006 | Martineau | E03C 1/02 285/323 |
| 2008/0012326 A1 * | 1/2008 | Braathen | F16L 19/0231 285/354 |
| 2008/0209619 A1 | 9/2008 | Bouchard | |
| 2009/0032761 A1 * | 2/2009 | Tsai | F16K 27/067 251/315.1 |
| 2010/0163131 A1 * | 7/2010 | Fehr | F16L 55/1108 138/89 |
| 2010/0276425 A1 * | 11/2010 | Stobbart | F16L 55/1152 220/327 |
| 2012/0043757 A1 | 2/2012 | Williams et al. | |
| 2012/0067436 A1 * | 3/2012 | Jacoway | E03C 1/021 137/15.18 |
| 2012/0273064 A1 * | 11/2012 | Ismert | F16L 5/10 137/360 |
| 2013/0000771 A1 * | 1/2013 | Beaton | E03C 1/021 138/96 R |
| 2015/0059862 A1 | 3/2015 | Spears, II | |
| 2015/0122343 A1 | 5/2015 | Ismert | |
| 2015/0308593 A1 * | 10/2015 | Brouwer | F16L 19/048 137/315.11 |

\* cited by examiner

PLUMBING FITTING ASSEMBLIES

CROSS REFERENCE TO RELATED APPLICATIONS

This application claims the benefit of U.S. Provisional Patent Application No. 61/898,930 filed Nov. 1, 2013, U.S. Provisional Patent Application No. 61/898,916 filed Nov. 1, 2013, and U.S. Provisional Patent Application No. 61/898,901 filed Nov. 1, 2013, which are all hereby incorporated by reference in their entireties. U.S. Non-Provisional patent application Ser. No. 14/529,333, filed Oct. 31, 2014, is also hereby incorporated by reference.

FIELD OF INVENTION

The present invention relates to plumbing fittings and assemblies.

BACKGROUND

In general, plumbing installation involves two stages. The first stage is the "rough plumbing installation." This stage generally occurs after a structure has been framed out and before walls for the structure are closed with drywall. The second stage is the "finish plumbing installation." This stage generally occurs after cabinets, drywall, sinks, counters, etc. have been installed at the structure. In between the two stages, other workers may hang drywall, mud the drywall, install tile and flooring, and install fixtures.

For many years, and until very recently, most plumbers would make their transition between the rough plumbing installation and the finish plumbing installation by "stubbing out" with copper pipe and closing the copper pipe with a metal nipple. At the finish plumbing installation, the plumber cuts off the nipple and sweats on a valve.

Currently, with the advance of flexible piping, such as PEX pipe, plumbers are stubbing out with the flexible pipe during the rough plumbing installation. After stubbing out with the flexible pipe, the plumbers crimp a test cap on to the end of the flexible pipe stub out with a crimp ring. This may complete the rough plumbing installation. The plumbers then return at a later date to perform the finish plumbing installation and complete the job. During the finish plumbing installation, the plumbers cut off the test cap and the crimp ring from the flexible pipe stub out, and then may crimp on a valve suitable for the flexible pipe. This practice has numerous problems. First, the stub out is often fouled with paint or other debris, such as drywall mud. Second, the stub out is often scarred from job-site abuse. This makes a push connection or a crimping connection to the stub out difficult and may result in improper sealing of the valve to the stub out.

Conventional flexible pipe connections can also be difficult to properly make. Specialized tools are required at the finish plumbing installation in order to both cut the pipe and to crimp on the final valve to the pipe. This can also be very difficult, as the finish plumbing installations are often in tight spaces, such as behind a toilet or under a counter and sink.

Further, after the flexible pipe has been cut and the valve crimped thereon, it makes the valve very hard to service or replace in the future. This is because there is often little to no flexible pipe left before the valve. And, if the valve needs to be cut out or fixed, the plumber may have to tear out the drywall, which is expensive and difficult. Further, the final assembly of the valve is time consuming and wasteful, as the test cap and ring are thrown away and the plumber must make a difficult connection, with the appropriate tool, often in awkward positions.

SUMMARY

Described herein are methods and systems for plumbing fitting assemblies that are easy to properly install. The plumbing fitting assemblies use a male and female fitting combination that enables a user or installer to make a sealed connection on an internal diameter of a female part or receiving end by way of an o-ringed shank on a male part or insert end. A connecting device is rotatably attached to the male end. The connecting device also engages to an outer surface of the female part such that the sealed fitting assemblies will not disconnect under normal pressure of a fluid or air working through the assemblies. The fitting assemblies will not disconnect unless an installer or user person intentionally disconnects the fitting assemblies by unthreading the nut or by other mechanical operation.

The plumbing fitting assemblies may be used with any of a variety of different types and styles of flexible pipe and tubing. For example, the plumbing fitting assemblies may be used with PEX tubing. PEX tubing is made from cross-linked polyethylene. PEX tubing is becoming a standard plumbing material.

The plumbing fitting assemblies provide several advantages. The male and female fitting combination provides a simple to install, tool-less sealed connection that may be made "blind," i.e., the installer does not have to see it, put a wrench on it, etc. In addition, it is simpler, more intuitive, and cheaper than other similar sealed connections, which utilize o-ring seals, such as hose connections (pull back fitting, snap to the receiving end) or push fittings that require an expensive keeper ring and create a blind connection. Further, the sealed connection is made on a controlled internal diameter that may be kept free from debris and/or damage instead of on the outer diameter of the pipe, which is often exposed to workplace damage and/or debris.

The plumbing fitting assemblies also creates "docking station" for an installer, which is intuitive. This is also welcome for marketing—as it helps installers stay with a particular brand/system of parts—as the receiver or female part is installed at the rough plumbing stage and the insert end or male part is installed during the finish plumbing stage. This is also of value for brands who want to sell replacement parts and have the end user stay with the original brand.

In field applications, the adaptor, receiver, or female part will most commonly be installed at the rough plumbing installation—which is typically before sheetrock is installed and far before the finish plumbing installed. This compares to the finish plumbing installation, where the finish plumbing fixtures are installed. This is typically some of the very last work a plumber or any contractor will do on a house or other remodel project. With the adaptor, receiver, or female part installed during the rough plumbing installation, the plumber or contractor can return for the finish plumbing installation and complete the finish plumbing installation without any specialized tool.

The plumbing fitting assemblies also provide a "modular" design and system, which helps with inventory control. For example, plumber, distributors, and, retailers may divide the receiver from the insert end and thus reduce the stocking SKU codes required on a truck or on a store shelf. This saves time and money.

The receiver may also include common thread sizes such that the receiver will also work with common valves and other off the shelf plumbing fittings. As such, the receiver may be used in forming the seal between the male and female are parts described herein, and also, if needed, make a seal with a common FIP valve, which can be found at virtually every hardware store.

The nut also shrouds the o-rings on the insert end or male part. The nut, in this way, protects the o-rings during shipping and/or before final installation. A scarred or damaged o-ring might fail—leading to leaks and costly repairs.

The test cap is also useful during rough plumbing installations. All new plumbing installations require testing to ensure proper performance. The test cap allows the plumber to test for proper installation, and then transition between the rough plumbing and the finish plumbing. The test cap also protects both the threads on the receiver, and, more importantly, the test cap protects the internal diameter and sealing surface of the receiver, which helps to ensure a proper seal and a quality, leak free combination.

The plumbing fitting assemblies described herein may use the adaptor, receiver, or female part that is installed at the rough, and this adaptor receives the test cap that stays on until the finish plumbing is installed. The test cap is then removed and a final, finish valve is installed without a tool into the same adaptor. If the valve ever fails, it can be easy replaced without a tool—and in only a few seconds.

Methods of making plumbing connections are also described herein. One method includes connecting at least two separate pipes or other fluid/air conveying apparatus. The method includes providing one male end, having a male insert shank with an elastomeric seal attached to the shank. The method includes providing a threaded device, such as a nut, surrounding the male insert shank and the elastomeric seal. The method includes providing a female end, having an internal diameter designed to receive said male insert shank such that it combines with the shank to make a sealed connection. An outer diameter of the female end receives the threaded device that surrounds the male insert shank such that it connects the two ends of the two separate pipes together to prevent them from coming apart.

In one aspect, a valve fitting is described. The valve fitting includes an adaptor. The adaptor includes a supply end and a receiving end. The receiving end includes an exterior surface and an internal sealing surface. The valve fitting includes a valve assembly. The valve assembly includes an insert end, and the insert end includes a sealing surface. The insert end of the valve assembly inserts into the receiving end of the adaptor, and the sealing surface of the insert end seals against the internal sealing surface of the receiving end in a sealing engagement. A connecting device is engaged to the valve assembly. The connecting device engages to an exterior of the adaptor to hold the internal sealing surface of the receiving end of the adaptor and the sealing surface of the valve assembly together in the sealing engagement.

In another aspect, a valve fitting is described. The valve fitting includes a male part. The male part includes a shank. The shank comprises one or more o-rings positioned about an exterior the shank. The valve fitting includes a female part. The female part includes an internal sealing surface and an outer engaging surface. The internal sealing surface of the female part receives the shank of the male part in a sealing engagement. A connecting device is rotatably attached to the male part. The connecting device engages the engaging surface of the female part to hold the male part and the female part together to maintain the sealing engagement.

In another aspect, a valve fitting is described. The valve fitting includes an adaptor. The adaptor includes a supply end and a receiving end. The receiving end includes a threaded external diameter and an internal sealing surface. The valve fitting includes a valve assembly. The valve assembly includes an insert end. The insert end includes a sealing surface. The insert end of the valve assembly inserts into the receiving end of the adaptor to form a sealing engagement between the internal sealing surface of the receiving end of the adaptor and the sealing surface of the valve assembly. A nut is rotatably engaged to the to the valve assembly. The nut includes a threaded internal diameter. The threaded internal diameter of the nut threadably engages to the threaded external diameter of the adaptor to maintain the sealing engagement between the internal sealing surface of the receiving end of the adaptor and the sealing surface of the valve assembly.

DETAILED DESCRIPTION OF INVENTION

Figure 1:
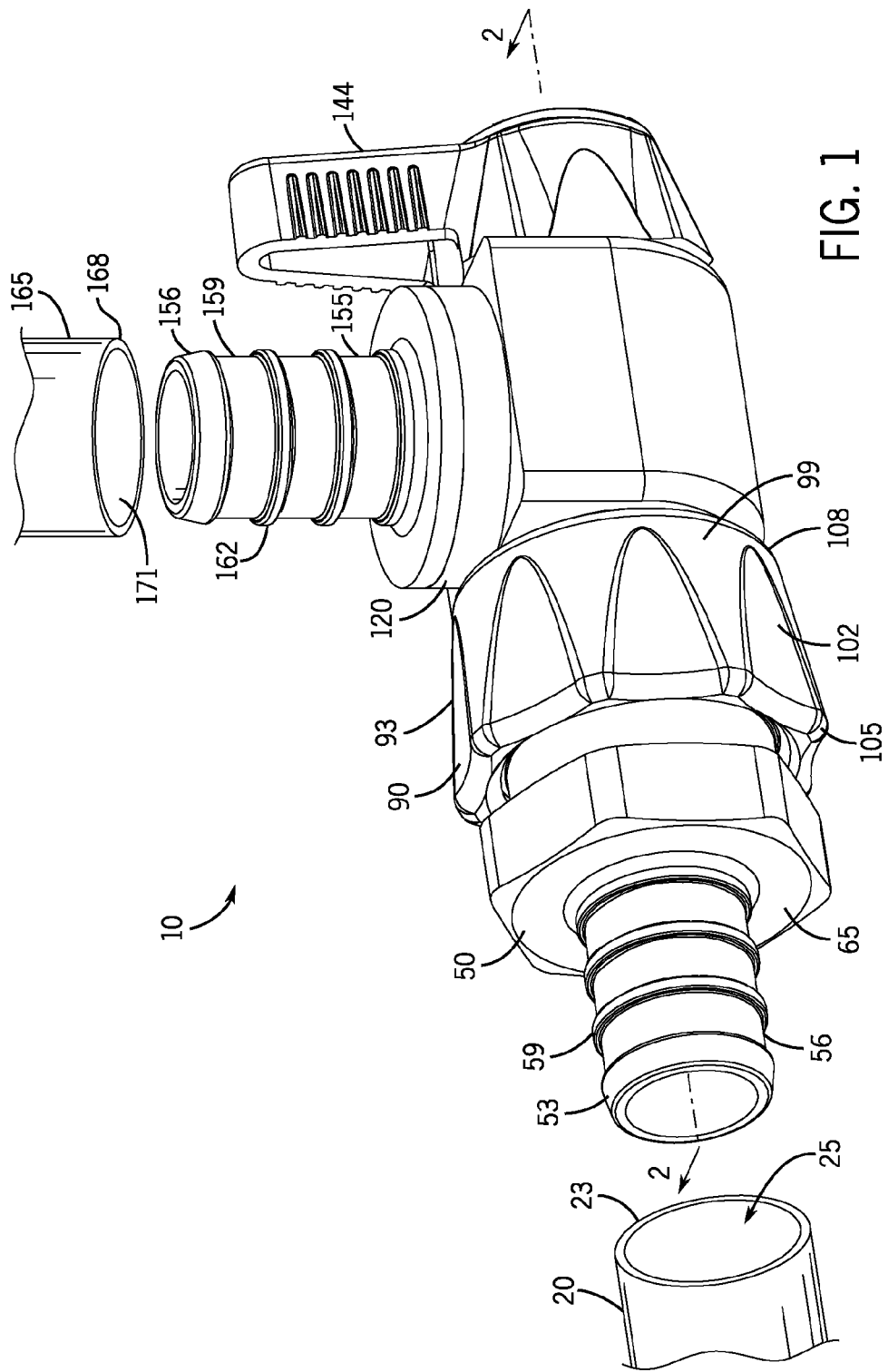
FIG. 1 is a perspective view of the angle valve fitting.
Figure 2:
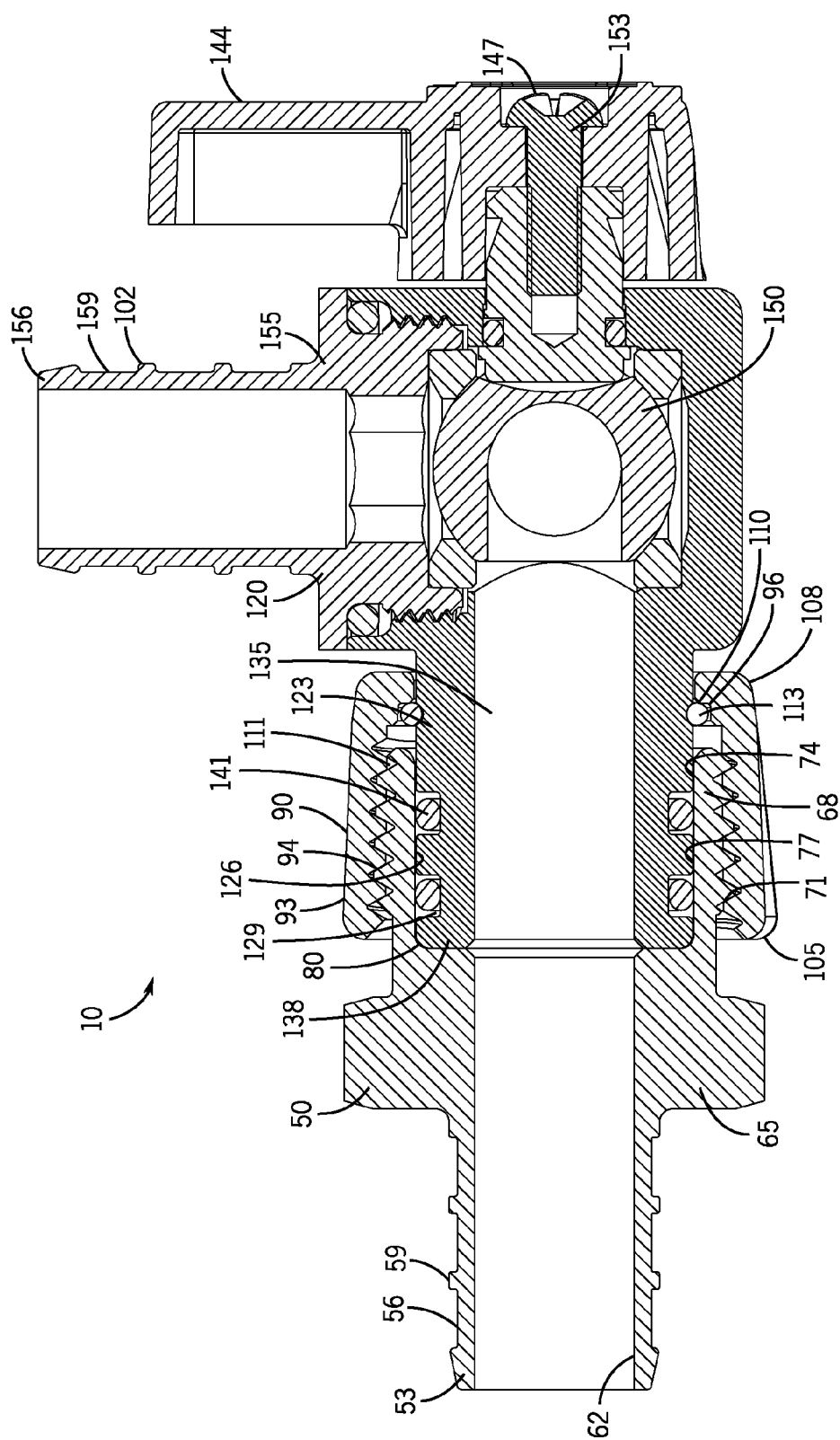
FIG. 2 is a sectional view of the angle valve fitting.
Figure 3:
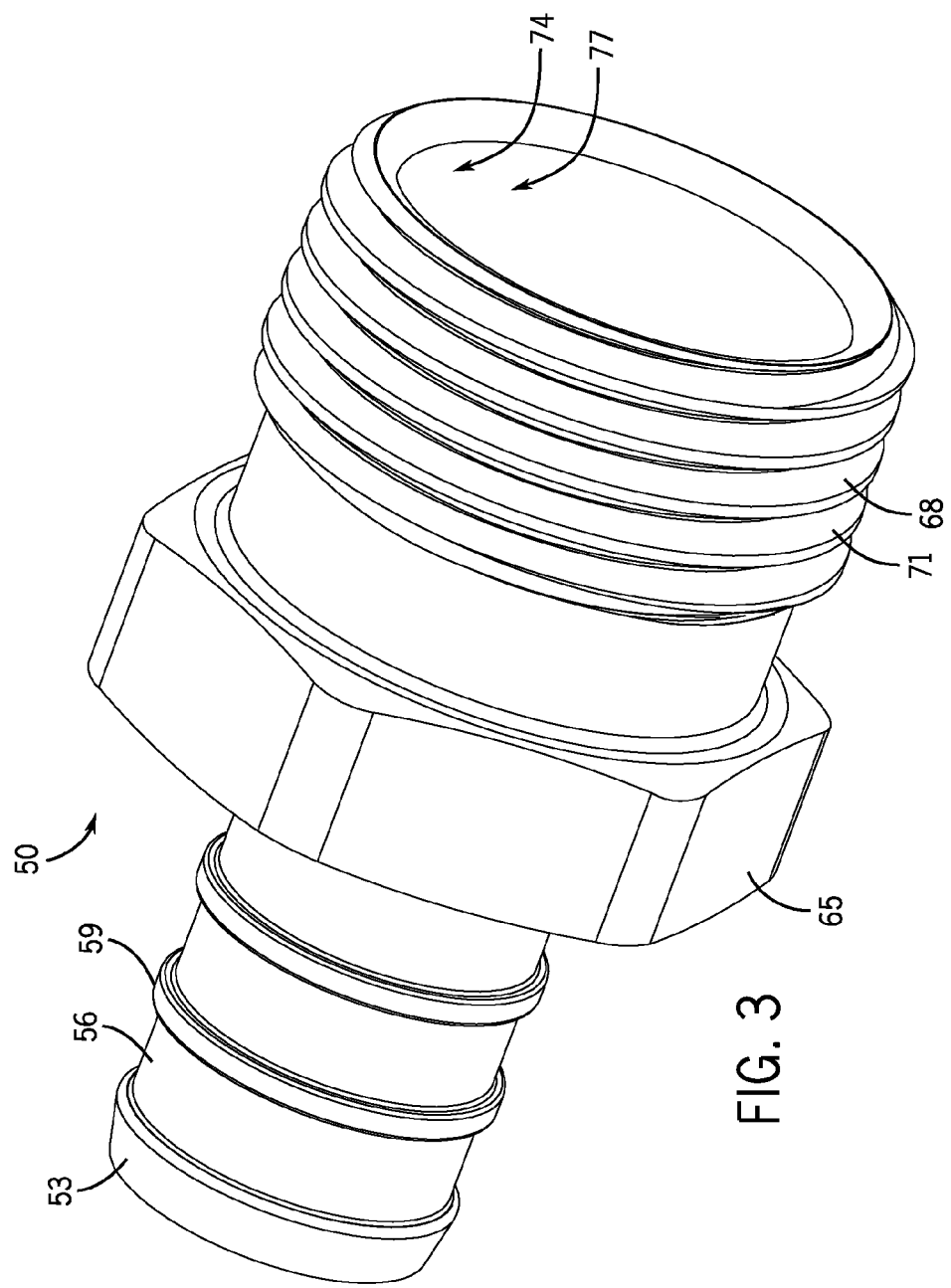
FIG. 3 is a perspective view of the adaptor.
Figure 4:
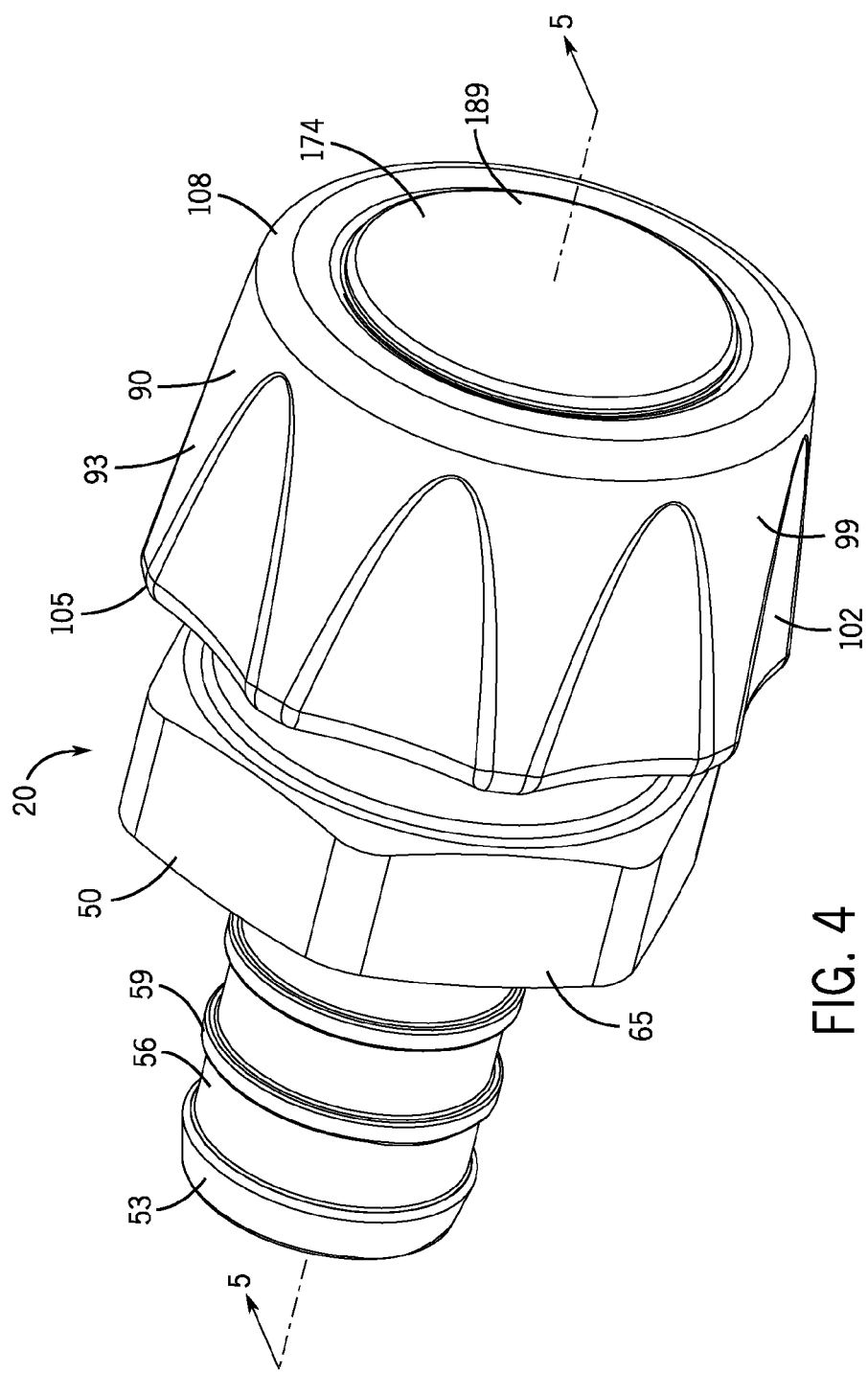
FIG. 4 is a perspective view of the test cap fitting.
Figure 5:
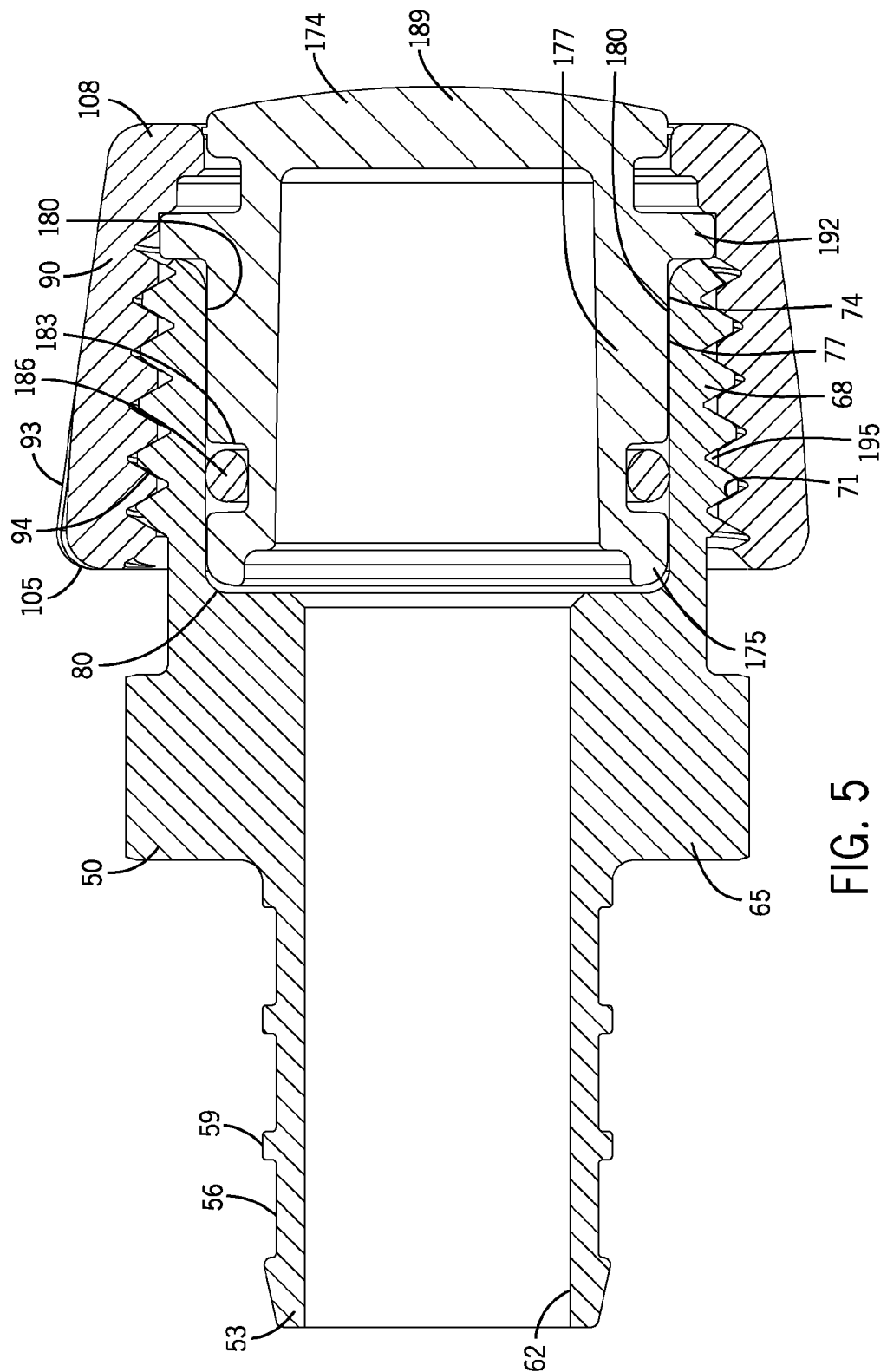
FIG. 5. is a sectional view of the test cap fitting
Figure 6:
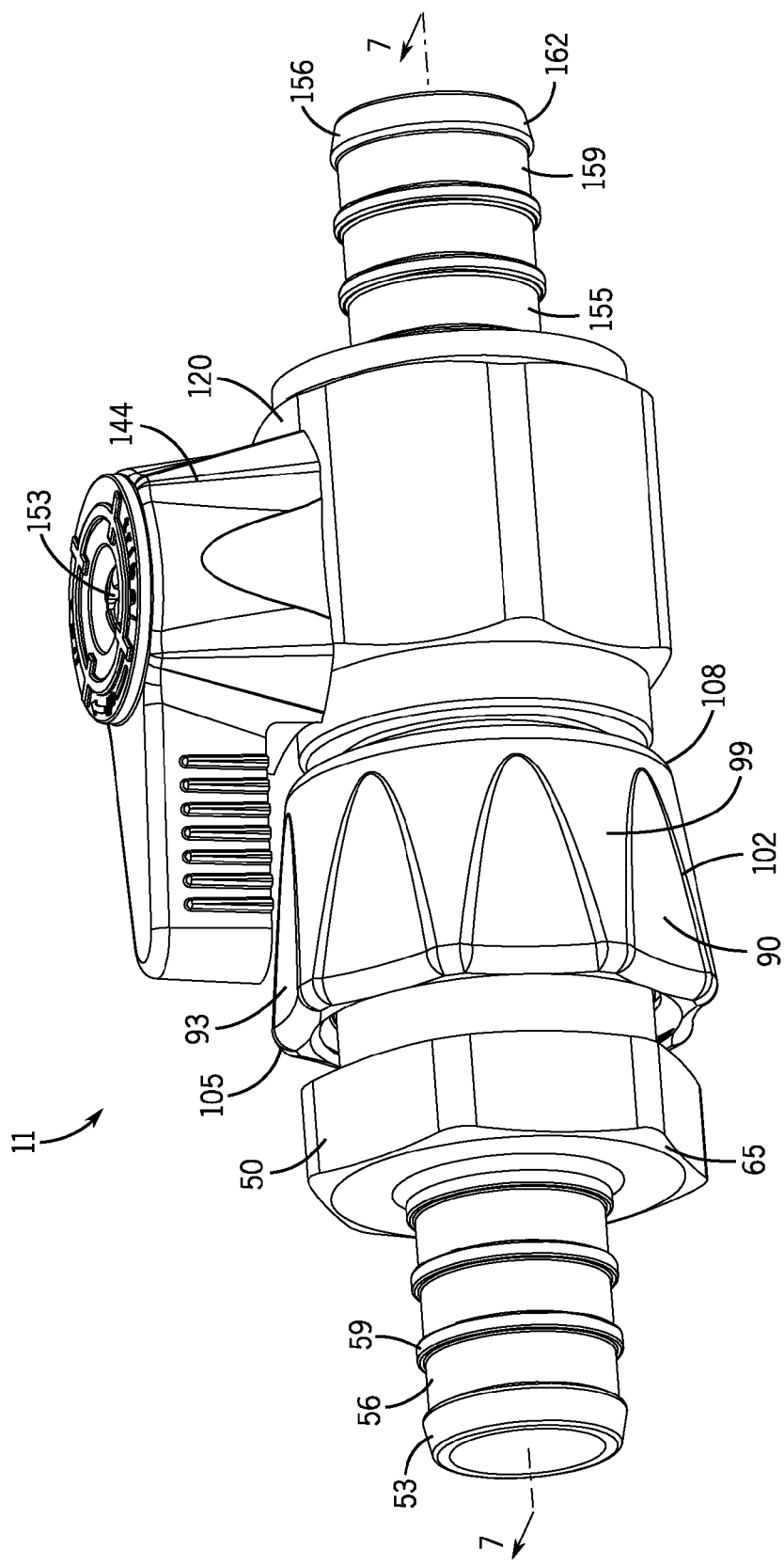
FIG. 6 is a perspective view of the straight valve fitting.
Figure 7:
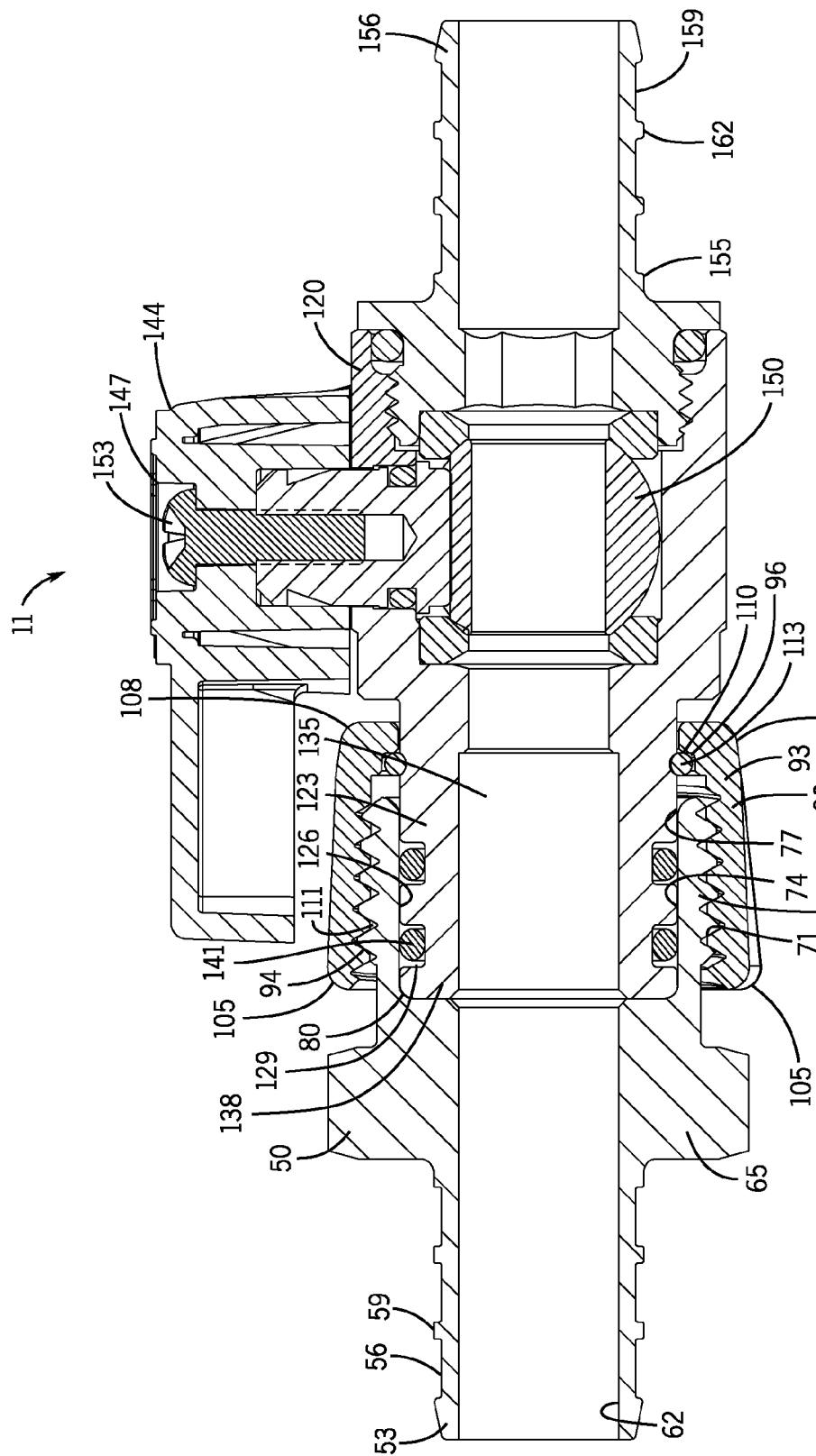
FIG. 7 is a sectional view of the straight valve fitting.

Plumbing fitting assemblies will now be described with reference to FIGS. 1-13. An angled valve fitting 10 is shown in FIGS. 1 and 2. The angled valve fitting 10 includes an adaptor 50 and a valve assembly 120. The adaptor 50 engages with the valve assembly 120 to form the valve fitting 10. The adaptor 50 is shown in FIG. 3 As shown in FIGS. 4 and 5, the adaptor 50 may also engage with a test cap 174 to form a test cap fitting 20. A connecting device 90 may be used in connecting the adaptor 50 to both the valve assembly 120 and the test cap 174. A straight valve fitting 11 connecting to the adaptor 50 is shown in FIGS. 6 and 7.

The plumbing fitting assemblies described herein allow the plumber to install the test cap fitting 20 to the adaptor 50 at the rough plumbing installation. When the plumber returns for the finish plumbing installation, the plumber may remove the connecting device 90 and remove the test cap 174 from the adaptor 50. Now, the plumber may engage the valve assembly 120 to the same adaptor 90 and make a seal using the same type of connecting device 90 that was used with the test cap 174 to complete the valve fitting 10. Notably, no specialized tools are required and no parts are discarded in making the seal.

The valve fitting 10 is shown in FIG. 1. The valve fitting 10 includes the adaptor 50 and the valve assembly 120. The adaptor 50 engages with the valve assembly 120 to form the valve fitting 10. As shown in FIGS. 4 and 5, the adaptor 50 may also engage with the test cap 174 to form the test cap fitting 20. The connecting device 90 may be used in connecting the adaptor 50 to both the valve assembly 120 and to the test cap 174.

The valve fitting 10 will now be described in detail. With reference to FIG. 1, a supply pipe 20 connects to a supply end 53 of the adaptor 50. Likewise, an outlet pipe 165 connects to an output opening 156 of the valve assembly 120. The supply pipe 20 provides fluid, such as air, gases, water, or other liquids to the adaptor 50. The supply pipe 20 may be made from PEX pipe or other flexible pipes or tubes.

The adaptor 50 will now be described in greater detail. The adaptor 50 includes the supply end 53, which connects to the supply pipe 20. The supply end 53 includes an external diameter 56 that fits inside of a pipe end 23 of the supply pipe 20. Ridges 59 extend from the external diameter 56 of the adaptor 50 and engage an internal diameter 25 of the pipe end 23. The supply end 53 may include a plurality of the ridges 59. The pipe end 23 may frictionally engage to supply end 53 via the ridges 59.

The adaptor 50 further defines an internal diameter 62 that provides for fluid flow through the adaptor 50. The supply end 53 is integral with or transitions into a transition region 65. The transition region 65 is generally positioned between the supply end 53 and a receiving end 68 of the adaptor 50. The adaptor 50 may include the supply end 53 generally opposite of the receiving end 68. In other aspects, the receiving end 68 may be oriented generally perpendicular or at a variety of different angles relative to the supply end 53.

The receiving end 68 includes a threaded external diameter 71. Opposite of the threaded external diameter 71, the receiving end 68 includes an internal diameter 74 that forms an internal sealing surface 77. The internal diameter 74 is generally smooth through the internal sealing surface 77. The transition region 65 further includes an interior corner 80 positioned on the inside of the receiving end 68 proximate to the transition region 65.

The connecting device 90 is rotatably engaged to an insert end 123 of the valve assembly 120. The insert end 123 of the valve assembly 120 forms a male part that inserts into the receiving end 68 of the adaptor 50. The connecting device 90 threadably engages to the threaded external diameter 71 of the receiving end 68 of the adaptor 50. Although the connecting device 90 is exemplified as a nut in FIGS. 1-13, the connecting device 90 may include any number of devices that maintain the seal between the insert end 123 and the adaptor 50.

The connecting device 90 includes walls 93 extending from a first end 105 to a second end 108. The walls 93 define or form a threaded internal diameter 94. The walls 93 include an external surface 99 that may include any of a variety of scallops 102 or other gripping regions or surfaces.

The connecting device 90 is held in the rotational engagement to the insert end 123 via a retaining ring 113. The retaining ring 113 circumscribes the insert end 123. The second end 108 of the connecting device 90 includes a groove 96 that receives the retaining ring 113, and a shoulder 110 of the second end 108 prevents the connecting device 90 from being pulled from the insert end 123. Until tightened to the adaptor 50, the connecting device 90 may freely rotate relative to the insert end 123.

An annular gap 111 is formed between the threaded internal diameter 94 of the connecting device 90 and the insert end 123 of the valve assembly 120. This annular gap 111 forms a space or void that is sized to receive the receiving end 68 of the adaptor 50. This annual gap 111 may extend approximately from the groove 96 holding the retaining ring 113 to the interior corner 80 of the adaptor 50. The insert end 123 forms a sealing surface 126, which may include one or more grooves 129. The sealing surface 126 may be generally smooth between the one or more grooves 129. The sealing surface 126 may have intermittent smooth surfaces that form the sealing surface 126. The grooves 129 may retain or include o-rings 141 that form a seal between the sealing surface 126 of the insert end 123 and the internal sealing surface 77 of the receiving end 68 of the adaptor 50. The insertion of the insert end 123 into the receiving end 68 of the adaptor 50 forms a sealing engagement between the internal sealing surface 77 of the receiving end 68 of the adaptor 50 and the sealing surface 126 of the insert end 123. The connecting device 90 holds the internal sealing surface 77 of the receiving end 68 of the adaptor 50 to the sealing surface 126 of the insert end 123 in the sealing engagement. During normal operation, the connecting device 90 prevents this sealing engagement from becoming unsealed.

The insert end 123 further defines a fluid passage 135 for fluid flow to flow through the valve assembly 120. An end portion 138 of the insert end 123 may abut or contact the interior corner 80 of the transition region 65 to indicate that a full seal has been achieved or that the connecting device 90 is fully tightened to prompt the user to stop rotating the connecting device 90.

The connecting device 90 also shrouds the o-rings 141 on the insert end 123. The connecting device 90, in this way, protects the o-rings 141 during shipping and/or before final installation. A scarred or damaged o-ring 141 might fail—leading to leaks and costly repairs. The connecting device 90 also shrouds the sealing surface 126 of the insert end 123. The connecting device 90 protects the sealing surface 126 during shipping and/or before final installation. Scarring or damage to the sealing surface 126 or debris on the sealing surface 126 might cause improper sealing—also leading to leaks and costly repairs.

The valve assembly 120 further includes a valve 150 positioned between the insert end 123 and the output end 155. A valve handle 144 may operatively engage the valve 150. A connector 153 may pass through the valve handle 144 and into an opening 147 of the valve assembly 120 to fix the valve handle 144 to the valve 150.

The output end 155 includes the output opening 156 that connects to the output pipe 165, which may be made from PEX pipe or other flexible pipes or tubes. A pipe end 168 of the output pipe 165 includes an internal diameter 171 that may fit over and engage an external diameter 159 of the output opening 156 of the output end 155 of the valve assembly 120. A plurality of ridges 162 on the external diameter 159 may frictionally engage to the internal diameter 171 of the pipe end 165.

The test cap fitting 20 will now be described with reference to FIGS. 4 and 5. The test cap fitting 20 includes a test cap 174 and the connecting device 90. The test cap fitting 20 engages with the adaptor 50. The test cap 174 includes an insert end 175 and a sealed end 189. Walls 177 extend between the insert end 175 and the sealed end 189. The walls 177 form an exterior sealing surface 180. The walls further form a groove 183 that may hold or contain an o-ring 186. An annular ring 192 positions the connecting device 90 on the test cap 174.

As the connecting device 90 is rotated, the internal sealing surface 77 of the adaptor 50 and the sealing surface 180 of the test cap 174 are held together in a sealing arrangement. The connecting device 90 may be rotated drawing the receiving end 68 into an annular gap 195 between the sealing surface 180 and the threaded internal diameter 94 of the connecting device 90.

The annular gap 195 is formed between the threaded internal diameter 94 of the connecting device 90 and the insert end 175 of the test cap 174. This annular gap 195 forms a space or void that is sized to receive the receiving end 68 of the adaptor 50. This annular gap 195 may extend approximately from the annular ring 192 to the interior corner 80 of the adaptor 50. The insert end 175 forms a sealing surface 180, which may include one or more grooves 183. The sealing surface 180 may be generally smooth between the one or more grooves 183. The sealing surface 180 may have intermittent smooth surfaces that form the sealing surface 180. The grooves 183 may retain or include o-rings 186 that form a seal between the sealing surface 180 of the insert end 175 and the internal sealing surface 77 of the receiving end 68.

The test cap 174 protects both the threaded external diameter 71 on the receiving end 68, and, more importantly, the test cap 174 protects the internal diameter 74 and sealing surface 77 of the adaptor 50, which helps to ensure a proper seal and a quality, leak free combination.

The adaptor 50 may formed from thermoplastics, such as glass filled nylon, polyethylene, polypropylene, or acrylonitrile butadiene styrene. The connecting device 90 may formed from the same or similar materials.

The connecting device 90 for engaging the adaptor 50 to the valve assembly 120 or to the test cap 174 may include any of variety of devices, such as nuts, threaded connectors, push-pull connectors, snap connectors, quarter or half turn nuts, etc. The connecting device 90 holds or maintains the sealing engagement between the adaptor 50 and the valve assembly 120 or to the test cap 174.

Figure 8:
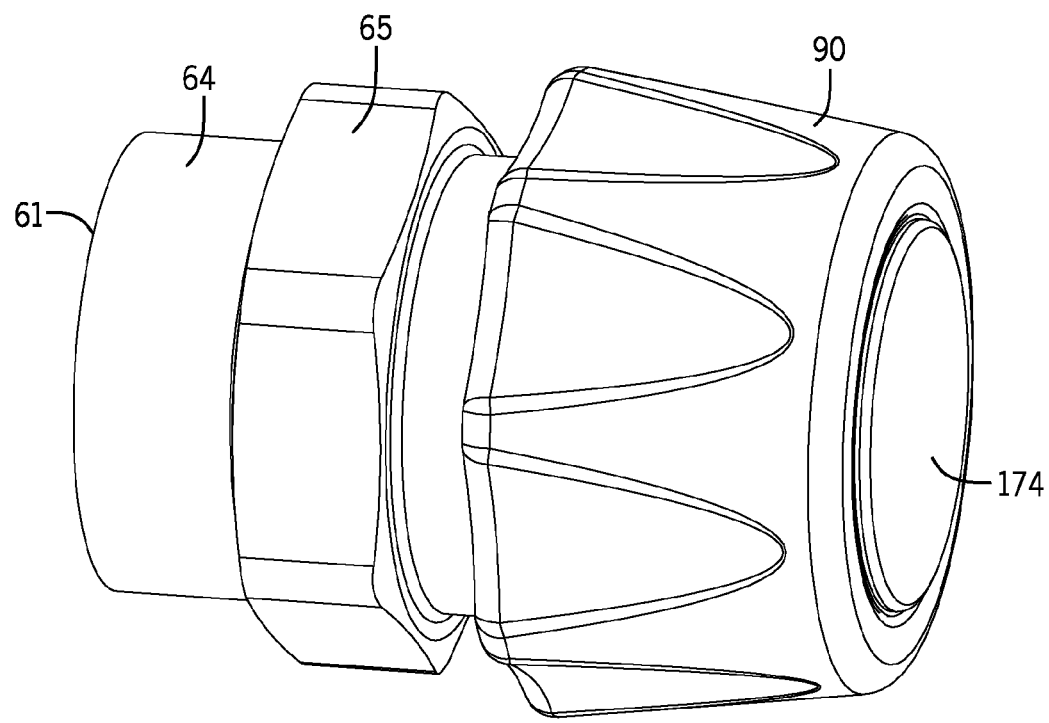
FIG. 8 is a view of the adaptor for a sweat installation.
Figure 9:
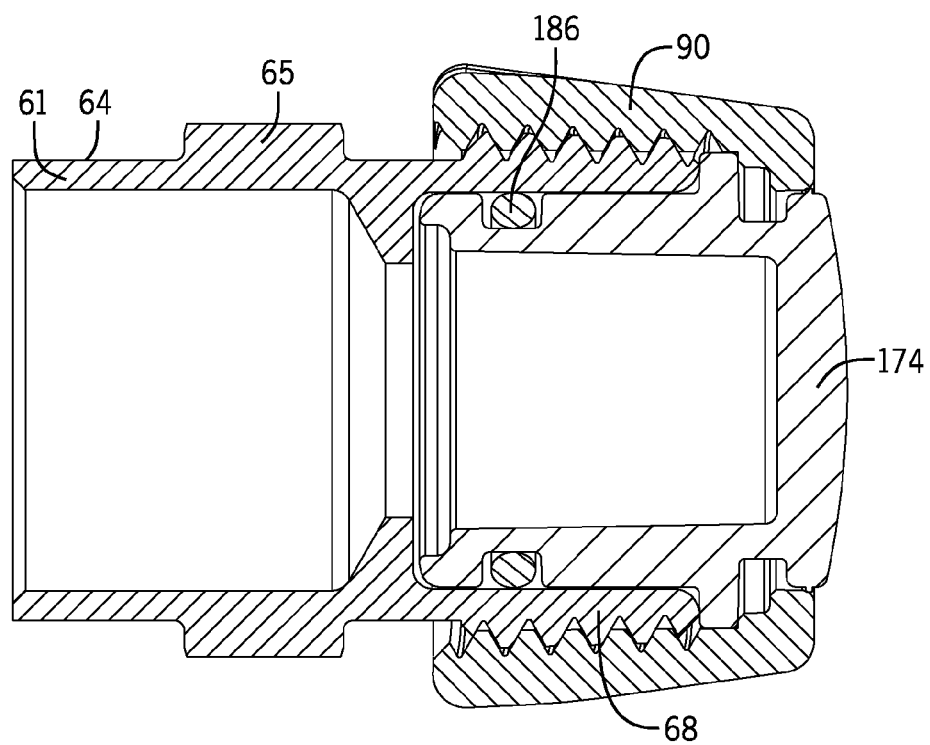
FIG. 9 is a sectional view of the adaptor of FIG. 8.
Figure 10:
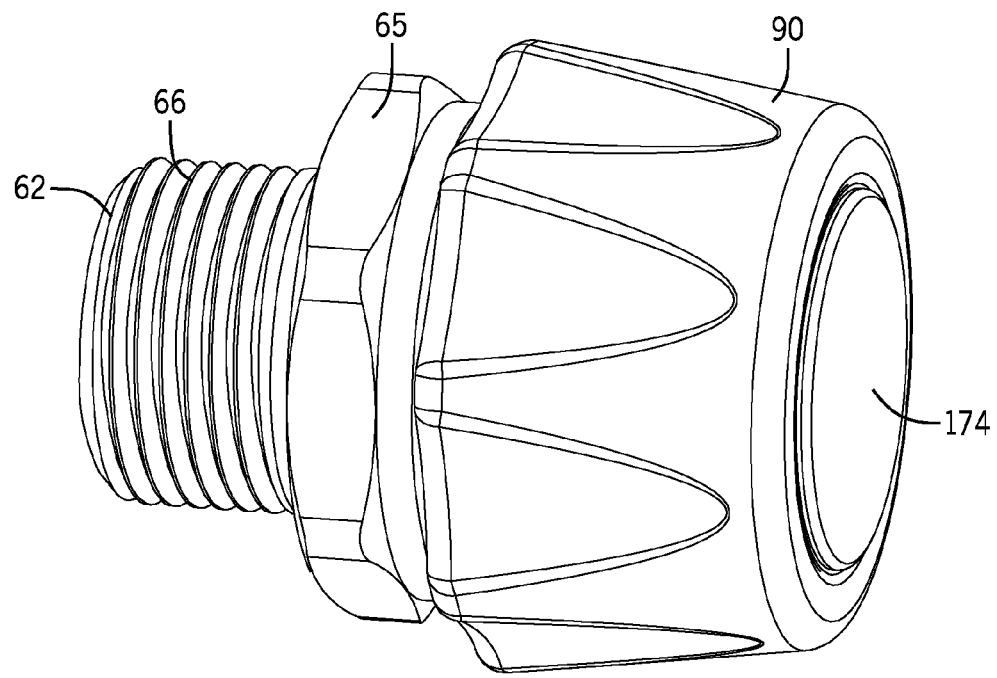
FIG. 10 is a view of the adaptor for a compression installation.
Figure 11:
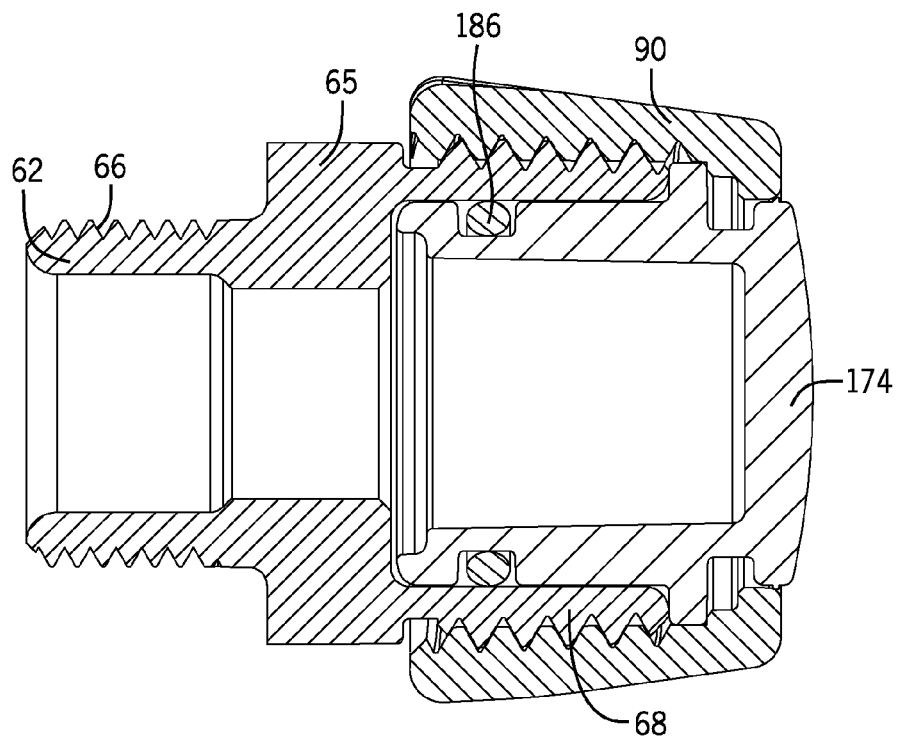
FIG. 11 is a sectional view of the adaptor of FIG. 10.
Figure 12:
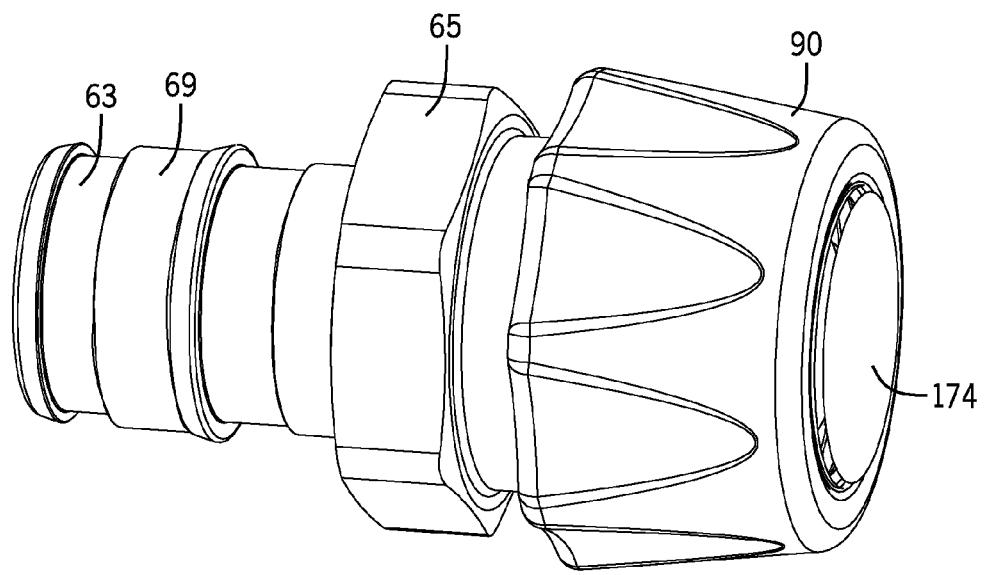
FIG. 12 is a view of the adaptor for a flexible tube installation.
Figure 13:
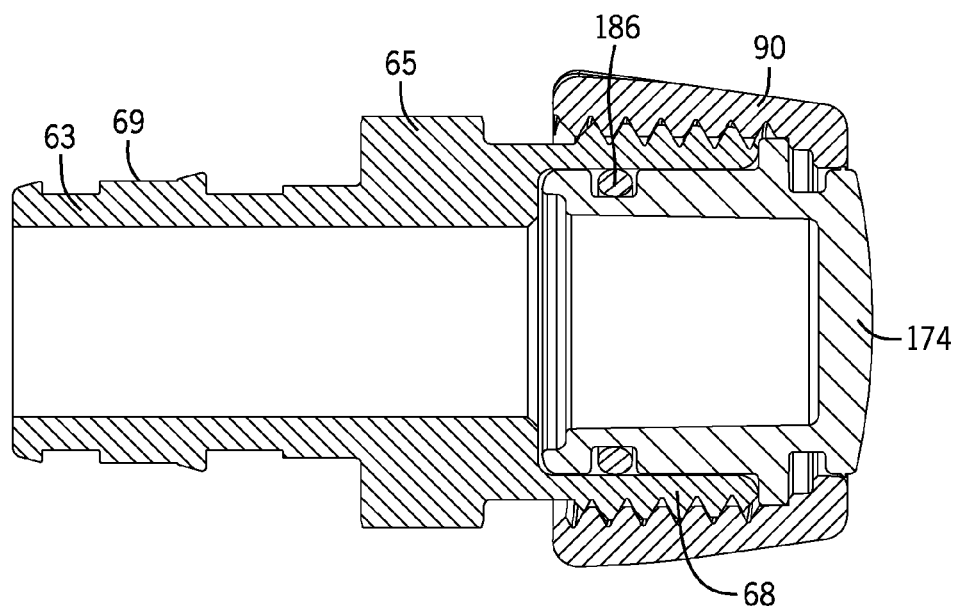
FIG. 13 is a sectional view of the adaptor of FIG. 12.

The adaptor 50 may be configured to engage with other conventional types of plumbing supply lines, for example, sweat, cpvc, compression, and other PEX types, etc. For example, FIGS. 8 and 9 are views of an adaptor 61 with a smooth outer surface 64 for a sweat installation. For example, FIGS. 10 and 11 are views of an adaptor 62 with a threaded surface 66 for a compression installation. For example, FIGS. 12 and 13 are views of an adaptor 63 with engagement surface 69 for a PEX installation. The adaptors 61, 62, and 63 include the receiving end 68 that is the same or similar to the receiving end 68 of the adaptor 50, and the adaptors 61, 62, and 63 operate in the same or similar manner. Although the adaptors 61, 62, and 63 are shown with the test cap 174, the adaptors 61, 62, and 63 may be used with the valve fittings 10 and 11 and other plumbing assemblies and fittings. Similarly, the output opening 156 of the valve assembly 120 may be configured to operate with other conventional types of plumbing lines, for example, sweat, cpvc, compression, and other PEX types, etc.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed is:

1. A valve fitting and test cap system, comprising:
   an adaptor, the adaptor comprising a supply end and a receiving end, the receiving end comprising an exterior surface and an internal sealing surface, the supply end configured to engage a supply pipe;
   a valve assembly, the valve assembly comprising a first insert end, the first insert end comprising a first sealing surface;
   the first insert end of the valve assembly inserts into the receiving end of the adaptor, and the first sealing surface of the first insert end seals against the internal sealing surface of the receiving end of the adaptor in a first sealing engagement, wherein the first sealing engagement is removable;
   a first connecting device rotatably engaged to the valve assembly, wherein the first connecting device engages to the exterior surface of the receiving end of the adaptor to hold the internal sealing surface of the receiving end of the adaptor and the first sealing surface of the first insert end of the valve assembly together in the first sealing engagement;
   a test cap assembly, the test cap assembly comprising a second insert end and a sealed end, the second insert end comprising a second sealing surface;
   the second insert end of the test cap assembly inserts into the receiving end of the adaptor, and the second sealing surface of the second insert end seals against the internal sealing surface of the receiving end of the adaptor in a second sealing engagement, wherein the second sealing engagement is removable;
   a second connecting device rotatably engaged to the test cap assembly;
   the second connecting device engages to the exterior surface of the receiving end of the adaptor to hold the internal sealing surface of the receiving end of the adaptor and the second sealing surface of the second insert end together in the second sealing engagement; and,
   the valve assembly inserts into the receiving end of the adaptor after removal of the test cap assembly from the receiving end of the adaptor.

2. The valve fitting and test cap system according to claim 1, wherein the first sealing surface of the first insert end includes one or more o-rings to seal again the internal sealing surface of the receiving end.

3. The valve fitting and test cap system according to claim 1, wherein the first connecting device shrouds or protects the first sealing surface of the first insert end.

4. The valve fitting and test cap system according to claim 1, wherein the first sealing surface of the first insert end includes one or more grooves.

5. The valve fitting and test cap system according to claim 4, wherein the first sealing surface is generally smooth between the one or more grooves.

6. The valve fitting and test cap system according to claim 5, wherein the grooves retain or include o-rings to form a seal between the first sealing surface of the first insert end and the internal sealing surface of the receiving end.

7. The valve fitting and test cap system according to claim 1, wherein the first sealing surface of the first insert end includes one or more o-rings to seal against the internal sealing surface of the receiving end, wherein the first connecting device shrouds or protects the first sealing surface of the first insert end, wherein the second sealing surface of the second insert end includes one or more o-rings to seal against the internal sealing surface of the receiving end, wherein the second connecting device shrouds or protects the second sealing surface of the second insert end.

8. The valve fitting and test cap system according to claim 1, wherein the valve assembly comprises a valve positioned between the first insert end and an output end of the valve assembly, and a valve handle is operatively engaged to the valve.

9. The valve fitting and test cap system according to claim 1, wherein the first connecting device is a nut, wherein the nut is rotatably engaged to the valve assembly, and the nut comprises a threaded internal diameter.

10. The valve fitting and test cap system according to claim 9, wherein the nut is held in the rotational engagement to the insert end via a retaining ring.

11. The valve fitting and test cap system according to claim 9, wherein the nut shrouds the first sealing surface on the first insert end.

12. The valve fitting and test cap system according to claim 1, wherein the first connecting device is a first nut, wherein the first nut is rotatably engaged to the valve assembly, and the first nut comprises a threaded internal diameter, wherein the second connecting device is a second nut, wherein the second nut is rotatably engaged to the test cap assembly, and the second nut comprises a threaded internal diameter.

13. The valve fitting and test cap system according to claim 12, wherein the receiving end of the adaptor comprises a threaded external diameter, wherein the threaded internal diameters of the first nut and the second nut threadably engage to the threaded external diameter of the receiving end of the adaptor.

14. The valve fitting and test cap system according to claim 12, wherein an annular gap is formed between the threaded internal diameter of the first nut and the first insert end of the valve assembly, and the annular gap forms a space or void that is sized to receive the receiving end of the adaptor.

15. The valve fitting and test cap system according to claim 1, wherein the test cap assembly protects the exterior surface of the receiving end.

16. The valve fitting and test cap system according to claim 1, wherein the test cap assembly protects the internal sealing surface of the adaptor.

17. The valve fitting and test cap system according to claim 1, wherein the test cap assembly engages to the adaptor during a rough plumbing installation, and the valve assembly engages to the adaptor during a finish plumbing installation.

18. The valve fitting and test cap system according to claim 1, wherein the test cap assembly engages to the adaptor during a rough plumbing installation, and the valve assembly engages to the same adaptor during a finish plumbing installation.

19. The valve fitting and test cap system according to claim 1, wherein the test cap assembly protects the internal sealing surface of the adaptor by engaging the test cap to the adaptor and leaving the test cap engaged to the adaptor until a finish plumbing installation.

20. The valve fitting and test cap system according to claim 1, wherein the valve assembly valve assembly and the test cap assembly alternatingly insert into the same receiving end of the adaptor.

21. The valve fitting and test cap system according to claim 1, wherein the valve assembly valve assembly and the test cap assembly alternatingly seal to the same internal sealing surface of the receiving end of the adaptor.

22. The valve fitting and test cap system according to claim 1, wherein the first and second connecting devices alternatingly engage to the same exterior surface of the receiving end of the adaptor.

23. A valve fitting and test cap system, comprising:
an adaptor, the adaptor comprising a supply end and a receiving end, the receiving end comprising a threaded external diameter and an internal sealing surface, the supply end to connect to a supply of water;
the adaptor to removably engage with a test cap assembly;
the adaptor to removably engage with a valve assembly after removal of the test cap assembly;
the valve assembly comprising a first insert end;
the first insert end comprising a first sealing surface;
the first insert end of the valve assembly inserts into the receiving end of the adaptor to form a first sealing engagement between the internal sealing surface of the receiving end of the adaptor and the first sealing surface of the first insert end of the valve assembly;
a first nut rotatably engaged to the valve assembly, the nut comprising a threaded internal diameter;
the threaded internal diameter of the first nut threadably engages to the threaded external diameter of the receiving end of the adaptor to maintain the sealing engagement between the internal sealing surface of the receiving end of the adaptor and the first sealing surface of the valve assembly;
the test cap assembly comprising a second insert end and a sealed end; the insert end comprising a second sealing surface;
the second insert end of the test cap assembly inserts into the receiving end of the adaptor;
a second nut rotatably engaged to the test cap assembly, the second nut comprising a threaded internal diameter; and,
wherein the threaded internal diameter of the second nut threadably engages the threaded external diameter of the adaptor to maintain the sealing engagement between the internal sealing surface of the receiving end of the adaptor and the second sealing surface of the test cap assembly.

24. A valve fitting and test cap system, comprising:
an adaptor, the adaptor comprising a supply end and a receiving end, the receiving end comprising a threaded outer diameter and a smooth inner diameter, the supply end configured to engage a supply pipe;
a valve assembly, the valve assembly comprising a first insert end;
the first insert end comprising a first sealing surface on an outer surface of the first insert end;
the first insert end of the valve assembly inserts into the receiving end of the adaptor to form a first removable sealing engagement between the smooth inner diameter and the first sealing surface of the first insert end of the valve assembly;
a first nut rotatably engaged to the valve assembly, the nut comprising a threaded internal diameter; and,
the threaded internal diameter of the first nut threadably engages to the threaded outer diameter of the receiving end of the adaptor to maintain the sealing engagement between the smooth inner diameter of the receiving end of the adaptor and the first sealing surface of the first insert end;
a test cap assembly, the test cap assembly comprising a second insert end and a sealed end; the second insert end comprising a second sealing surface on an outer surface of the second insert end;
the second insert end of the test cap assembly inserts into the receiving end of the adaptor;
a second nut rotatably engaged to the test cap assembly, the second nut comprising a threaded internal diameter;
wherein the threaded internal diameter of the second nut threadably engages the threaded external diameter of the adaptor to maintain a second removable sealing engagement between the smooth inner diameter of the receiving end of the adaptor and the second sealing surface of the test cap assembly; and, the valve assembly inserts into the receiving end of the adaptor after removal of the test cap assembly from the receiving end of the adaptor.

25. The valve fitting and test cap system according to claim 24, wherein the test cap assembly protects the threaded outer diameter on the receiving end of the adaptor.

26. The valve fitting and test cap system according to claim 24, wherein the test cap assembly protects the smooth inner diameter of the adaptor.

27. A valve fitting and test cap system, comprising:
an adaptor, the adaptor comprising a supply end and a receiving end, the receiving end comprising an exterior surface and an internal sealing surface, the supply end configured to engage a supply pipe;
a valve assembly, the valve assembly comprising a first insert end, the first insert end comprising a first sealing surface with one or more o-rings;
the first insert end of the valve assembly inserts into the receiving end of the adaptor, and the first sealing surface of the first insert end seals against the internal sealing surface of the receiving end of the adaptor in a first sealing engagement;
a first connecting device rotatably engaged to the valve assembly, wherein the first connecting device shrouds the first sealing surface of the first insert end, wherein the first connecting device removably engages to the exterior surface of the receiving end of the adaptor to hold the internal sealing surface of the receiving end of the adaptor and the first sealing surface of the first insert end of the valve assembly together in the first sealing engagement;
a test cap assembly, the test cap assembly comprising a second insert end and a sealed end, the second insert end comprising a second sealing surface with one or more o-rings;
the second insert end of the test cap assembly inserts into the receiving end of the adaptor, and the second sealing surface of the second insert end seals against the internal sealing surface of the receiving end of the adaptor in a second sealing engagement;
a second connecting device rotatably engaged to the test cap assembly; wherein the second connecting device shrouds the second sealing surface of the second insert end;
the second connecting device removably engages to the external surface of the receiving end of the adaptor to hold the internal sealing surface of the receiving end of the adaptor and the second sealing surface of the second insert end together in the second sealing engagement, and,
wherein the valve assembly and the test cap assembly alternatingly insert into the receiving end of the adaptor.

28. A valve fitting and test cap system, comprising:
an adaptor, the adaptor comprising a supply end and a receiving end, the receiving end comprising an exterior surface with a threaded engagement surface and an internal sealing surface, the supply end configured to engage a supply pipe;
a valve assembly, the valve assembly comprising an insert end, the insert end comprising a sealing surface;
the insert end of the valve assembly inserts into the receiving end of the adaptor, and the sealing surface of the insert end seals against the internal sealing surface of the receiving end of the adaptor in a first sealing engagement;
a connecting device rotatably engaged to the valve assembly, wherein the connecting device engages to the exterior surface of the receiving end of the adaptor to hold the internal sealing surface of the receiving end of the adaptor and the sealing surface of the insert end of the valve assembly together in the first sealing engagement;
a test cap, the test cap comprising a threaded engagement member and a sealed end;
the threaded engagement member of the test cap threadably engages to the threaded engagement surface of the exterior surface of the adaptor in a second sealing engagement; and,
wherein the valve assembly valve assembly inserts into the receiving end of the adaptor after removal of the test cap assembly.

* * * * *